United States Patent
Stella

(10) Patent No.: US 9,811,925 B2
(45) Date of Patent: Nov. 7, 2017

(54) METHOD AND APPARATUS TO RENDER LINES ON A DISPLAY SCREEN

(71) Applicant: Texas Instruments Incorporated, Dallas, TX (US)

(72) Inventor: Michel Georges Stella, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 46 days.

(21) Appl. No.: 14/867,449

(22) Filed: Sep. 28, 2015

(65) Prior Publication Data

US 2016/0110894 A1    Apr. 21, 2016

Related U.S. Application Data

(60) Provisional application No. 62/064,066, filed on Oct. 15, 2014.

(51) Int. Cl.
    *G06T 11/20*    (2006.01)
    *G06F 3/0484*   (2013.01)
    *G06F 3/0488*   (2013.01)

(52) U.S. Cl.
    CPC ........ *G06T 11/203* (2013.01); *G06F 3/04845* (2013.01); *G06F 3/04883* (2013.01)

(58) Field of Classification Search
    CPC ............................ G06T 11/20; G06T 11/203
    See application file for complete search history.

(56) References Cited

U.S. PATENT DOCUMENTS

| | | | |
|---|---|---|---|
| 4,914,522 A | 4/1990 | Duffield et al. | |
| 4,998,010 A | 3/1991 | Chandler et al. | |
| 6,628,279 B1* | 9/2003 | Schell | G06F 3/04845 345/420 |
| 6,792,398 B1* | 9/2004 | Handley | G06F 3/016 345/419 |
| 2001/0033690 A1 | 10/2001 | Berche et al. | |
| 2002/0141643 A1 | 10/2002 | Jaeger | |
| 2009/0207174 A1 | 8/2009 | Chen | |
| 2011/0083104 A1 | 4/2011 | Minton | |
| 2014/0015809 A1 | 1/2014 | Zay et al. | |
| 2014/0111486 A1 | 4/2014 | Zay et al. | |
| 2014/0227669 A1 | 8/2014 | Khan et al. | |
| 2015/0142379 A1 | 5/2015 | Stella | |
| 2016/0063745 A1* | 3/2016 | Wiemker | G06T 11/203 345/629 |
| 2016/0155248 A1* | 6/2016 | Ng | G06T 11/203 345/441 |

* cited by examiner

*Primary Examiner* — Phi Hoang
(74) *Attorney, Agent, or Firm* — Rose Alyssa Keagy; Charles A. Brill; Frank D. Cimino

(57) ABSTRACT

Disclosed examples include drawing apparatus and methods of rendering lines on a display screen, in which a first angle is determined that corresponds to a hand drawn line created by a user on the display screen, and a new line is rendered on the display screen to represent the hand drawn line created by the user. The new line is selectively rendered parallel or perpendicular to an existing line on the display screen at least partially according to the first angle using the processor.

20 Claims, 9 Drawing Sheets

| EXISTING LINE | EXISTING LINE ANGLE θL | LINE-LINE ANGLE θLL | PERPENDICULAR LINE-LINE ANGLE θLL-90 |
|---|---|---|---|
| A-B | θL1 | θLL1 = θL1 - θHDL | θLL1 - 90 = θL1 - θHDL - 90 |
| B-C | θL2 | θLL2 = θL2 - θHDL | θLL2 - 90 = θL2 - θHDL - 90 |
| C-A | θL3 | θLL3 = θL3 - θHDL | θLL3 - 90 = θL3 - θHDL - 90 |

METHOD AND APPARATUS TO RENDER LINES ON A DISPLAY SCREEN

REFERENCE TO RELATED APPLICATION

Under 35 U.S.C. §119, this application claims priority to, and the benefit of, U.S. provisional patent application Ser. No. 62/064,066, entitled "FORCING LINES TO BE PARALLEL OR PERPENDICULAR TO EXISTING LINES IN GEOMETRIC HAND DRAWING", and filed on Oct. 15, 2014, the entirety of which is hereby incorporated by reference.

TECHNICAL FIELD

The presently disclosed embodiments are related to drawing tools and more particularly to rendering lines on a display screen.

BACKGROUND AND INCORPORATION BY REFERENCE

Computer-based drawing tools allow users to draw lines, artifacts, and other things on a display screen. In certain applications, a user desires to draw a line on a display screen for measurement or learning purposes, such as to ascertain the height or elevation of a previously drawn triangle or rectangle. In this case, the user might use a mouse or other input device to hand draw a line parallel with the bottom or base of a previously drawn triangle. However, the user typically is unable to draw a straight line using a mouse or touchscreen, and the resulting hand drawn line is not parallel to the base of the previously drawn triangle. In another example, a user may wish to draw a line perpendicular to a previously drawn line on a display screen. The above-mentioned difficulties with hand drawing straight lines will typically prevent the user from creating a hand drawn straight line that is truly perpendicular as desired. Accordingly, existing computer-based drawing tools are insufficient for many educational and other applications for drawing lines on a display screen.

SUMMARY

Disclosed examples include systems, methods and computer readable mediums with computer-executable instructions for rendering lines on a display screen. In certain examples, a processor is used to determine a first angle corresponding to a hand drawn line created by a user on the display screen, and to render a new line to represent the hand drawn line created by the user. The processor selectively renders the new line parallel to, or perpendicular to, an existing line rendered on the display screen at least partially according to the first angle. Disclosed examples provide improvements over present computer-based drawing tools by selectively adapting hand drawn lines to be parallel or perpendicular to pre-existing lines on the display screen to mitigate or overcome the above-mentioned difficulties for users in drawing lines using a touchscreen, mouse or other user input device. In certain examples, the processor renders the new line as a straight line to replace the hand drawn line. In certain examples, moreover, the angular difference between the first angle of the hand drawn line and one or more pre-existing lines in the display screen is compared with a threshold, and the angular difference between the first angle and a perpendicular offset of the pre-existing line or lines is compared with the threshold. If the angular differences both exceed the threshold, the apparatus can selectively draw the new line without angular adjustment to be parallel or perpendicular to a pre-existing line. In addition, the user may adjust the threshold in certain embodiments. In this manner, the user is provided with a useful tool to selectively adjust hand drawn lines for parallel or perpendicular angular relationships with existing lines or structures within a drawing, and still have the freedom to create non-parallel and non-perpendicular lines as desired.

DETAILED DESCRIPTION

Figure 1:
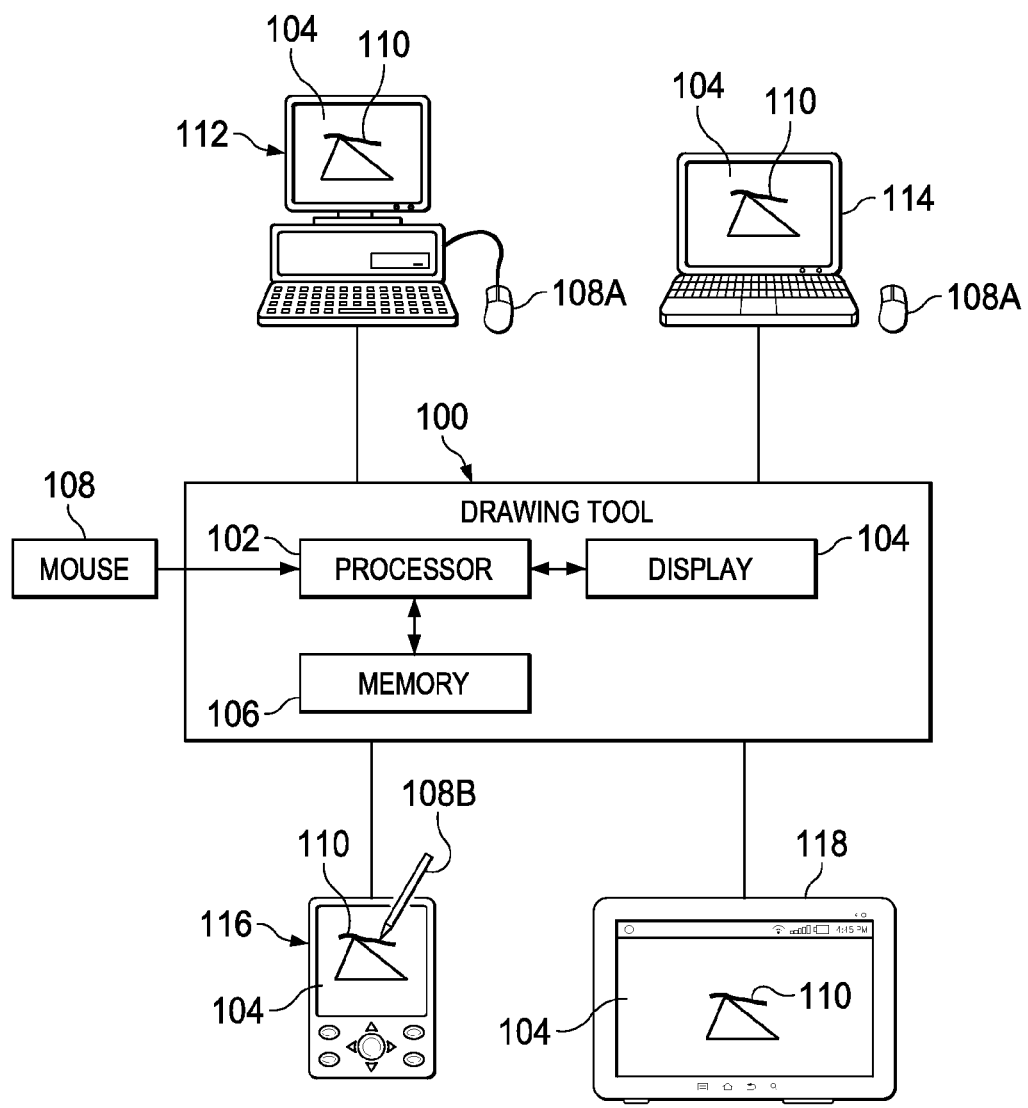
FIG. 1 is a system view of a drawing apparatus.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . ".

FIG. 1 illustrates a drawing tool or apparatus 100 including a processor 102, a display screen 104 and an electronic memory 106. The apparatus 100 can be implemented in a variety of host systems having a user interface that includes one or more pointing devices 108 such as a mouse 108A, and/or a touchscreen type display 104. In one example, the drawing apparatus 100 is implemented in a personal computer 112 having a display screen 104 and a mouse 100A providing user input data to the processor 102. In another example, the drawing apparatus 100 is implemented in a laptop computer 114, which may include one or more pointing devices such as a mouse 108A, a trackpad (not shown), a trackball (not shown), and/or the laptop computer 114 can include a touchscreen display 104. In another example, the drawing apparatus 100 is implemented in a smart phone 116 with a touchscreen display 104. In another example, the drawing apparatus 100 is implemented in a tablet computer 118 with a touchscreen display 104. In host system examples that include a touchscreen display 104, the user can draw lines and shapes by finger touch action and/or using a drawing implement, such as a stylus 108B. In these examples, the host system 112, 114, 116 or 118 includes a user interface by way of a touchscreen display 104 and/or one or more pointing devices 108 to provide input data associated with a hand drawn line 110 created by a user.

Figures 6, 7:
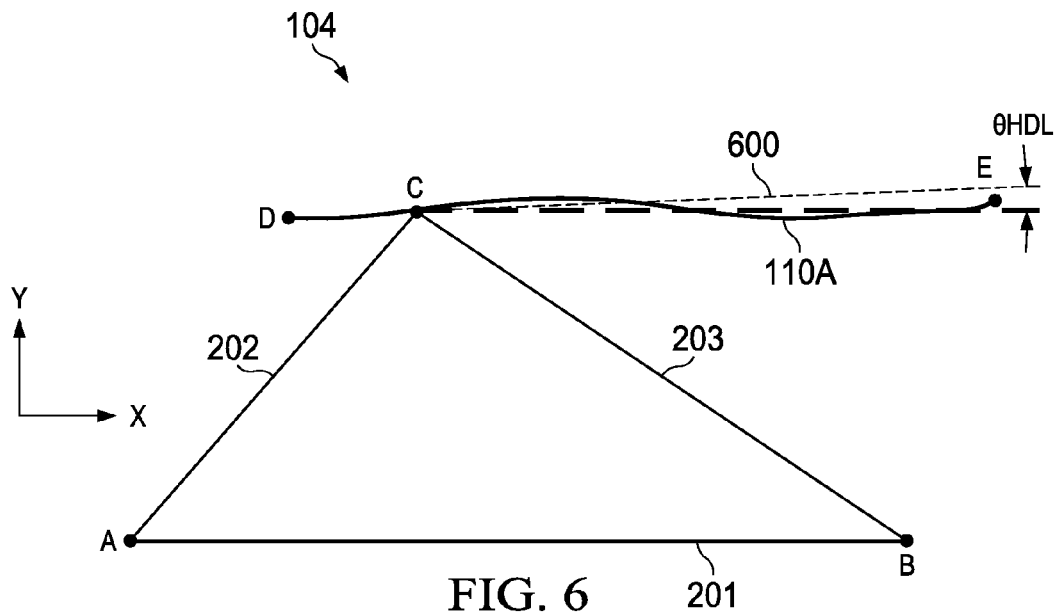
FIG. 6 is a diagram of the display screen showing a computed first angle corresponding to the first hand drawn line created by the user on the display screen.
FIG. 7 is a diagram showing memory entries for existing line angles, as well as computed parallel and perpendicular line-line angles for each existing line of the triangle rendered on the display screen relative to the first hand drawn line drawn by the user.

Any suitable processor 102 can be used that executes program instructions stored in the electronic memory 106 or other suitable computer readable medium to perform the drawing and computation functions set forth herein. The electronic memory 106 stores computer readable instructions for execution by the processor 102, and also stores data related to lines and other features drawn on the display screen 104, as seen in FIG. 7 below. In addition, the memory 106 in some examples stores program instructions and data for use by the processor 102 in performing other functions associated with the host system 112, 114, 116 or 118. As seen in FIG. 1, the drawing tool apparatus 100 interfaces with the display screen 104 in order to render or otherwise visually present one or more lines and features on the display screen 104, such as a triangle (not numerically designated in FIG. 1) and one or more hand drawn lines 110.

Figure 2:
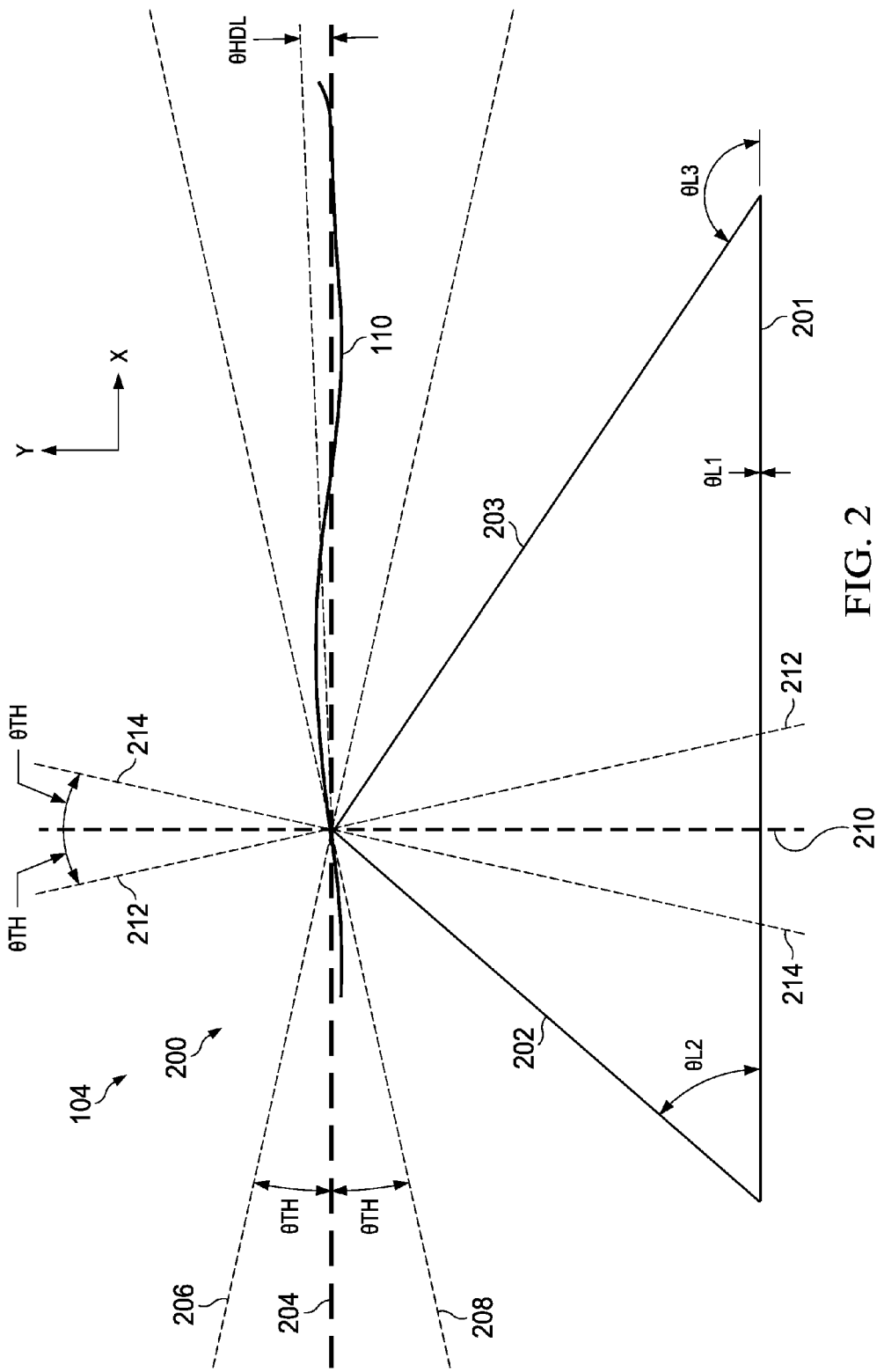
FIG. 2 is a diagram of a hand drawn line and an existing triangle formed by three existing lines on a display screen.

FIG. 2 shows a display screen rendering example 200 in which a triangle has been previously rendered on the display screen 104. The existing triangle structure includes a first line 201 forming a horizontal base, as well as second and third lines 202 and 203, respectively. Each of the existing lines 201, 202 and 203 has an associated line angle C. The line angles θL can be measured or computed with respect to any suitable direction in the illustrated X-Y plane. In one example, the line angles θL are relative to the "X" or horizontal axis. In this case, the first line angle θL1 associated with the first triangle line 201 is 0 degrees as the lower base of the triangle is parallel to the X axis direction (θL1=0). The second line 202 has an associated angle θL2 with respect to the X direction, and the 203 of the triangle has an associated line angle θL3 with respect to the X direction. Although various angles are described hereinafter in units of degrees, the angles may be quantified in any suitable angular measurement units, including without limitation degrees, radians and/or gradians. In one example, the user previously created the individual lines 201-203 to define the triangle using the drawing apparatus 100. In another example, the user employed the drawing tool apparatus 100 to render the triangle as a unitary shape including the lines 201-203.

As seen in FIG. 2, the user has created a hand drawn line 110 on the display screen, and the line 110 is generally horizontal, but not truly straight. The hand drawn line 110 in this example has a first angle or hand drawn line angle θHDL with respect to the horizontal or X axis direction determined using linear curve fitting by the apparatus 110. In one example, the user draws the line 110 by touching a touchscreen display 104 on a computer 112, 114 are 118 or on a smart phone 116 in FIG. 1. In another example, the user draws the line 110 using a stylus 108B, or may use another form of pointing device (e.g., mouse, trackpad, trackball, stylus, etc.) to draw the line 110. The first angle θHDL is within an angle threshold range +/−θTH of a horizontal line 204 passing through the uppermost corner of the triangle. In this example, the angle threshold θTH is 12.5 degrees, and the user is able to adjust the angle threshold θTH of the drawing apparatus 100 between 0 degrees and 45 degrees. FIG. 2 further shows lines 206 and 208 illustrating the angular boundary defined by the angle threshold θTH relative to the horizontal line 204. In addition, FIG. 2 shows a vertical line 210 passing through the uppermost corner of the existing triangle, as well as lines 212 and 214 illustrating the angular boundary defined by the angle threshold θTH relative to the vertical line 210.

The drawing apparatus 100 of FIG. 1 advantageously provides a processor-implemented tool to assist users in drawing lines on the display screen 104. For example, the user may desire to draw the elevation of the triangle in FIG. 2 going through the uppermost corner point as a horizontal line parallel to the base line 201, or the user may wish to draw a generally vertical line to show the altitude of the triangle going through the uppermost corner point. Using a touchscreen or pointing device of a computer system, however, the user may not be adept enough to draw a truly straight line, or to draw truly parallel or perpendicular lines with respect to existing lines on the display screen 104.

As seen in FIG. 2, the drawing apparatus 100 allows a user to provide a touch or pointing device input or gesture to create a hand drawn line 110 within parallel or perpendicular threshold limitations shown by lines 206, 208, 212 and 214 (θTH), and the apparatus 100 generates a new line that is parallel or perpendicular to an existing line (e.g., line 201 in the example of FIG. 2) rendered on the display screen 104. In certain examples, the processor 102 of the apparatus 100 determines the first angle θHDL corresponding to the hand drawn line 110, and renders a new line (e.g., lines 800, 1200 in FIGS. 8 and 12 below) on the display screen 104 to represent the hand drawn line 110 created by the user. In addition, where the user's hand drawn line 110 is within the angle threshold range defined by θTH, the apparatus 100 renders the new line either parallel or perpendicular to an existing line rendered on the display screen 104 at least partially according to the first angle θHDL corresponding to the hand drawn line 110. Otherwise, if the hand drawn line created by the user is outside the angle threshold range (e.g., FIGS. 13-15 below), the drawing tool apparatus 100 provides a new straight line (1500) that is not parallel or perpendicular to existing lines on the display screen 104, but is instead drawn according to the first angle θHDL.

In addition, the angle threshold θTH in certain examples is adjustable by the user. In this manner, the user can perform gestures or other drawing actions via the computer system user interface for a natural drawing experience without requiring any special user dexterity or special user interface tools in order to create parallel and/or perpendicular lines relative to existing lines and features rendered on the display screen 104. In this manner, the tolerance set by the angle threshold θTH can be set to 0 degrees in order to disable the parallel/perpendicular line redrawing capabilities of the apparatus 100, or the user can adjust the threshold up to 45 degrees at which the apparatus 100 will draw each new line perpendicular or parallel to an existing line on the display screen 104. In between, the user can set a desired angle threshold θTH according to their own personal preferences for accommodating the user's drawing abilities and limitations, as well as the capabilities and limitations associated with a given form of user input equipment (e.g., touchscreen, mouse, trackpad, trackball, stylus, etc.).

Figure 3:
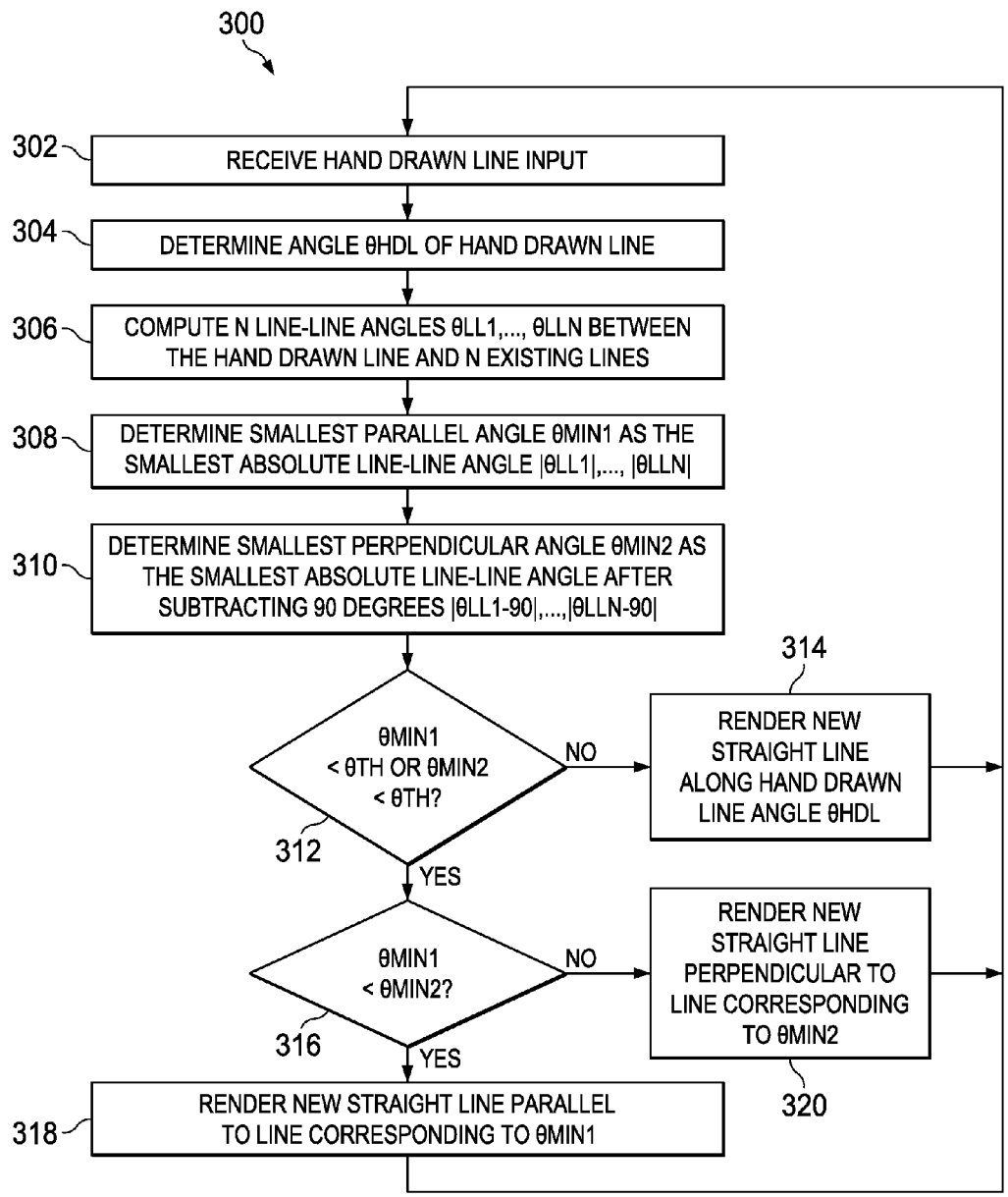
FIG. 3 is a flow diagram showing a method of rendering lines on a display screen.
Figure 4:
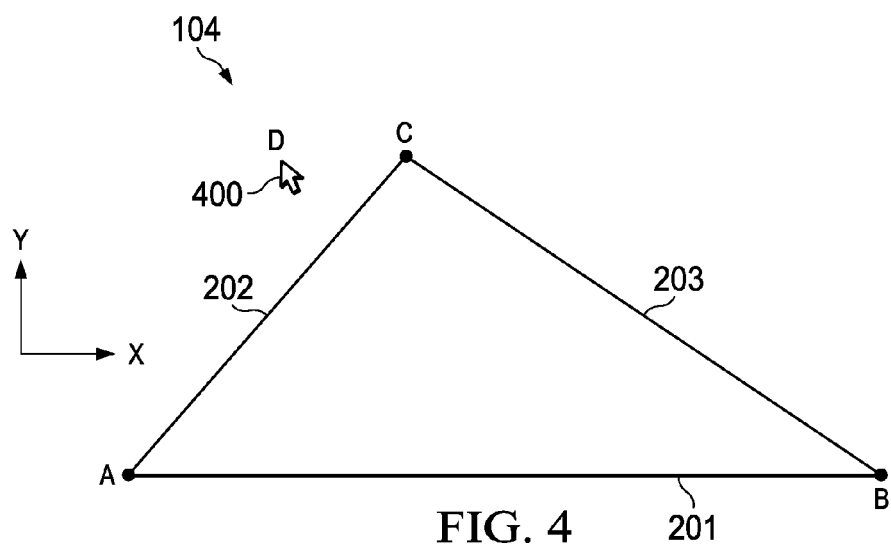
FIG. 4 is a diagram of a display screen with an existing triangle showing a user beginning to draw a generally horizontal first hand drawn line using a touchscreen display or a pointing device.

Referring now to FIGS. 3-8, FIG. 3 depicts a flow chart showing a process or method 300 of rendering lines on a display screen. In certain examples, the processor 102 of FIG. 1 executes instructions stored in the electronic memory 106 to implement the method 300 of FIG. 3. The method 300 begins at 302 with a pre-existing line or lines already rendered on the display screen 104. FIG. 4 shows an example with the pre-existing triangle formed by lines 201, 202 and 203. Line 201 extends between a point labeled "A" and a point labeled "B". Similarly, the second line 202 extends between the point A and a point "C", and the third line 203 extends between the points C and B.

Figure 5:
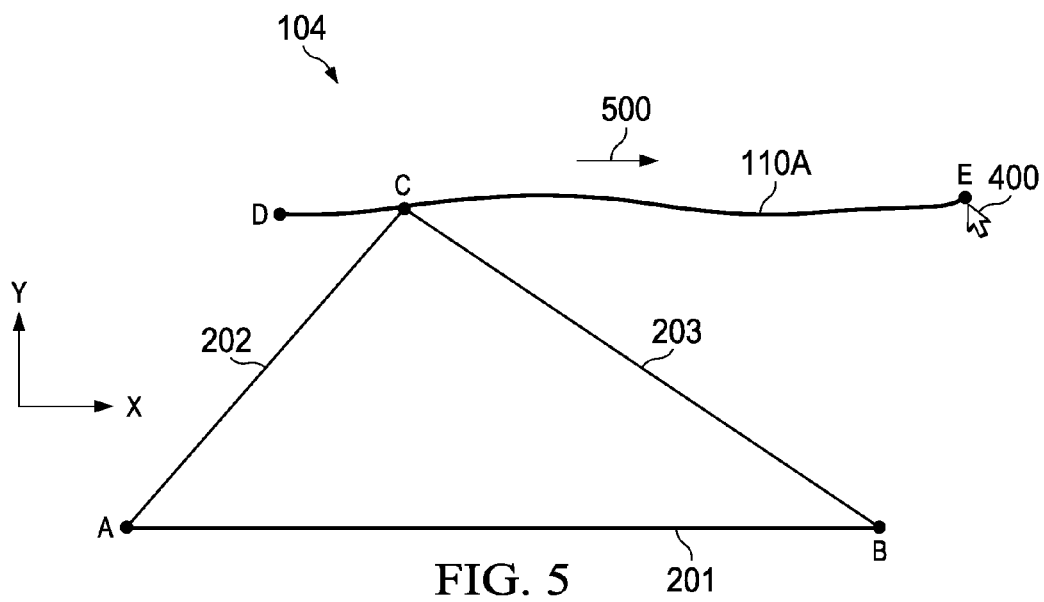
FIG. 5 is a diagram of the display screen in FIG. 2 showing the user finishing the first hand drawn line.

At 302 in FIG. 3, the apparatus 100 (e.g., the processor 102) receives input data or information from the user interface pertaining to a hand drawn line created by the user. As seen in FIG. 4, the user in one example begins a hand drawn line by locating a cursor 400 at a start point labeled "D". Continuing in FIG. 5, the user continues the line generally along a horizontal direction 500 (e.g., using a mouse 108A or hand gesture on a touchscreen display 104) until an end point "D" is reached, as shown by the cursor symbol 400 on the display screen 104, to define a hand drawn line 110A. As seen in FIG. 5, the hand drawn line 110A is generally horizontal, and therefore somewhat parallel to the first existing line 201. However, the hand drawn line 110A is not perfectly straight, and not strictly parallel or perpendicular with respect to any of the existing lines 201-203 on the display screen 104.

Continuing at 304 in FIG. 3, the processor 102 determines a first angle θHIDL associated with the hand drawn line 110, as further shown in FIG. 6. In one example, the processor 102 performs any suitable form of linear curve fitting algorithm according to program instructions in the memory 106 to compute a straight line 600 corresponding to the angular orientation of the hand drawn line 110. In certain examples, the apparatus 100 will compute the corresponding straight line 600, but this need not be rendered on the display screen 104. The processor 102 in this example determines the hand drawn line angle θHDL with respect to a horizontal direction (e.g., with respect to the X axis direction). The processor 100 to then selectively renders a new line parallel or perpendicular to an existing line according to a smallest parallel angle θMIN1 between the first angle θHDL and a line angle θL of one of the existing lines 201-203, or according to a smallest perpendicular angle θMIN2 between the first angle θHDL and one of the existing line angles θL.

At 306 in FIG. 3, the processor 102 computes or otherwise determines an integer number "N" parallel line-line angles θLL individually corresponding to an integer number "N" existing lines rendered on the display screen 104. In the example of FIGS. 4-8, the existing triangle includes three such lines 201-203, and N=3. The parallel line-line angles θLL1, θLL2 and θLL3 are computed in one example as the difference between the hand drawn line angle θHDL and the corresponding line angles θL for lines 201-203 (e.g., θLL1=θL1−θHDL, θLL2=θL2−θHDL, and θLL3=θL3−θHDL). FIG. 7 shows memory entries in the electronic memory 106 for three existing line angles θL1, θL2 and θL3, and the corresponding parallel line-line angles θLL1, θLL2 and θLL3. The processor 102 in one example also computes an integer number N perpendicular line-line angles θLL-90 for each corresponding existing line 201-203, and these are stored in the memory 106 as shown in FIG. 7 (e.g., θLL1-90=θL1−θHDL-90, θLL2-90=θL2−θHDL-90, and θLL3-90=θL3−θHDL-90). The individual perpendicular angles represent the angle between the first angle θHDL and the angle θL of the corresponding existing line offset by 90 degrees. At 308, the processor 102 determines the smallest parallel angle θMIN1 as the smallest absolute parallel line-line angle (e.g., the smallest of |θLL1|, |θLL2| and |θLL3|). At 310, the processor 110 determines the smallest perpendicular angle θMIN2 as the smallest absolute line-line angle offset by 90 degrees (e.g., the smallest of |θLL1-90|, |θLL2-90| and |θLL3-90|).

At 312 in FIG. 3, the processor 102 determines whether the smallest parallel angle θMIN1 is less than the angle threshold θTH, or whether the smallest perpendicular angle θMIN2 is less than θTH. If not (NO at 312), the processor 102 renders the new line is a straight line along the first angle θHDL associated with the hand drawn line 110. This means that the angle threshold θTH has been set to 0 by the user, or that the first angle θHDL of the hand drawn line 110 created by the user is not within the parallel or perpendicular angle range set by θTH.

Figure 8:
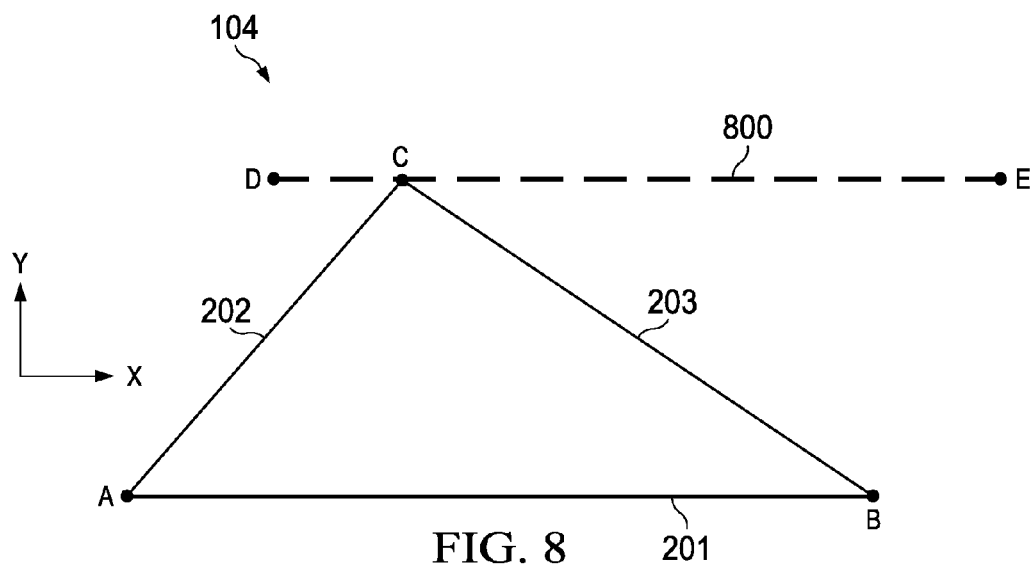
FIG. 8 is a diagram of the display screen showing a new straight line rendered parallel to the existing triangle base line by the drawing apparatus of FIG. 1 based on the first hand drawn line created by the user.

If either of the minimum parallel and perpendicular angles θMIN1 or θMIN2 is less than the angle threshold θTH (YES at 312 in FIG. 3), the processor 102 determines the smaller of the minimum angles at 316. If θMIN1 is less than θMIN2 (YES at 316), this means that the hand drawn line 110 created by the user is closer to being parallel with one of the existing lines 201-203 than it is to being perpendicular to one of the existing lines 201-203. In this case, the processor 102 renders the new straight line at 318 in FIG. 3 parallel to the line corresponding to the minimum parallel angle θMIN1. This is shown in the example of FIG. 8, where the apparatus 110 renders a straight new line 800 extending parallel to the first existing line 201 corresponding to the bottom or base of the existing triangle on the display screen 104. As seen in FIG. 8, the new line 800 created by the drawing tool apparatus 100 can be shown in dashed line or dotted form, or of a different color than other lines, and/or of a different thickness than the existing lines 201-203 in one example, in order to indicate to the user that this line has been substituted for the hand drawn line 110 created by the user. In certain examples, the user may be given the option to accept or reject this line substitution or replacement.

Figure 9:
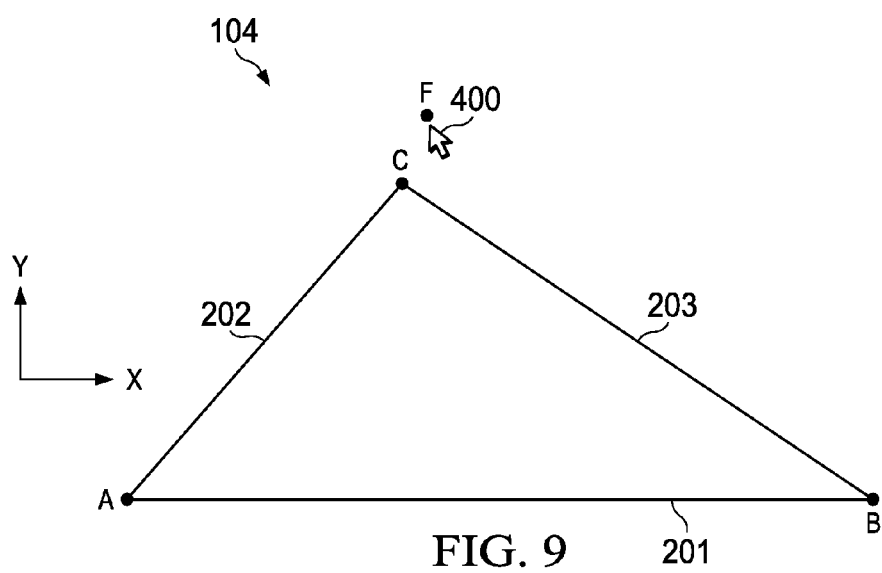
FIG. 9 is a diagram of the display screen with the existing triangle showing a user beginning to draw a generally vertical second hand drawn line.
Figure 10:
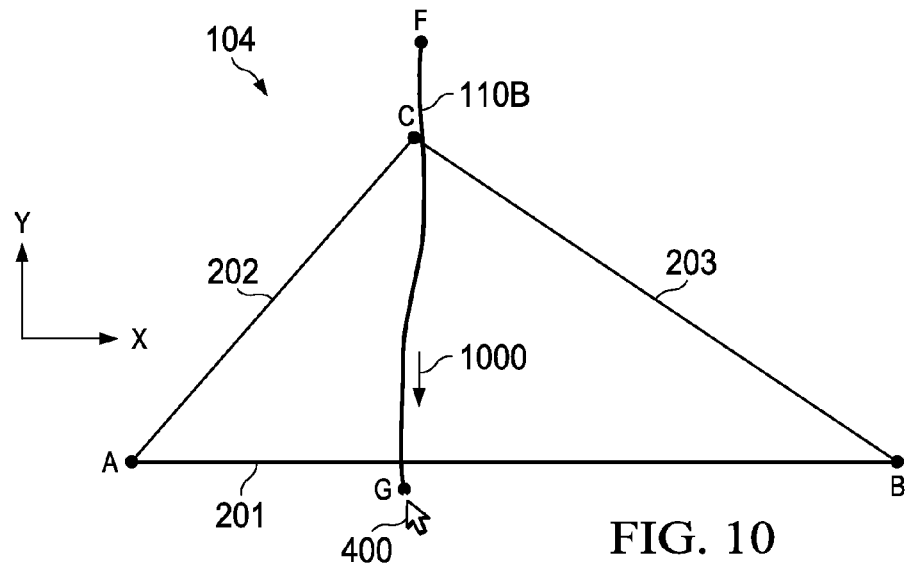
FIG. 10 is a diagram of the display screen of FIG. 9 showing the user finishing the second hand drawn line.
Figure 11:
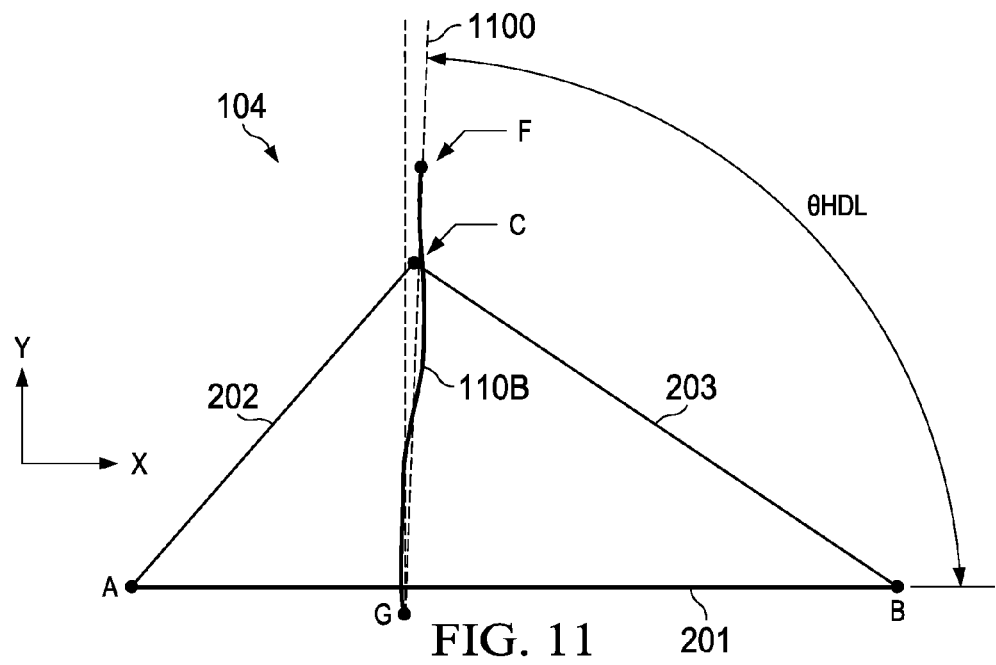
FIG. 11 is a diagram of the display screen showing a computed first angle corresponding to the generally vertical second hand drawn line.
Figure 12:
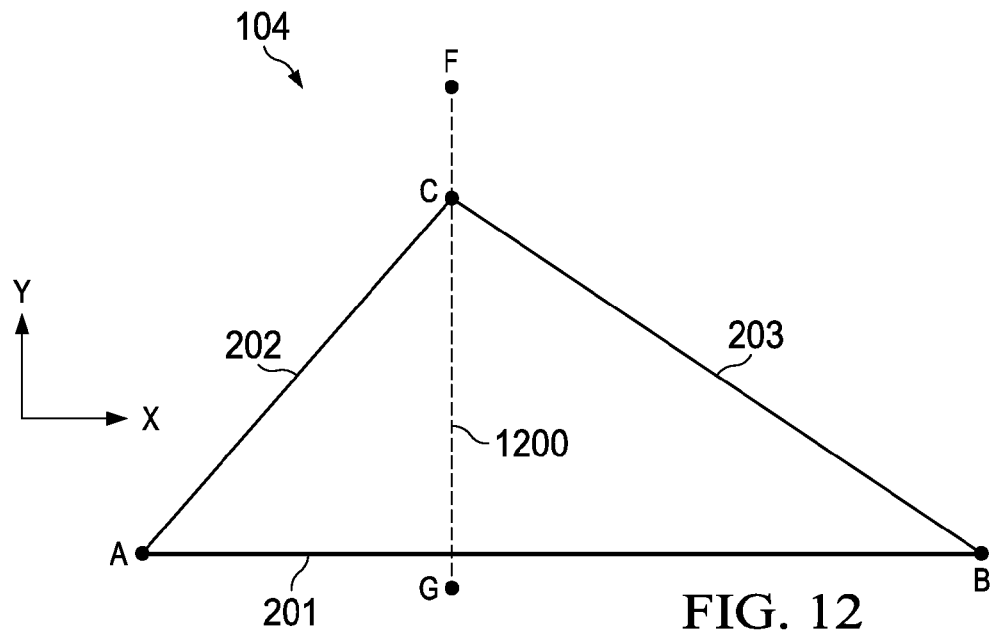
FIG. 12 is a diagram of the display screen showing a new straight line rendered perpendicular to the existing triangle base line by the drawing apparatus of FIG. 1 based on the angle of the second hand drawn line created by the user.

Referring now to FIGS. 3 and 9-12, if θMIN2 is less than θMIN1 (NO at 316 in FIG. 3), the processor 102 renders the new straight line at 320 perpendicular to the line corresponding to the minimum perpendicular angle θMIN2. This represents the situation in which the hand drawn line 110 created by the user is closer to being perpendicular to one of the existing lines 201-203 than it is to being parallel with one of the existing lines 201-203. As seen in FIG. 9, the user in this example desires to draw a generally vertical line beginning at point "F", by using a mouse or other pointing device to position the cursor 400 at that point. FIG. 10 shows the display screen 104 after the user has move the cursor downward generally in the direction 1000 to an end point "G" to create a generally vertical second hand drawn line 110B. The processor 102 in this case determines the first angle θHDL associated with the hand drawn line 110B by curve fitting a straight line 1100 in FIG. 11 with the hand drawn line 110B, and determines the first angle θHDL with respect to the X axis direction as in the previous example. As seen in FIG. 11, the curve fitted line 1100 is at an angle of slightly less than 90° with respect to the positive X direction. The processor 102 implements the process 300 of FIG. 3 with respect to this first angle θHDL (e.g., 306-320 in FIG. 3), and determines at 312 that the smallest minimum perpendicular angle θMIN2 is less than the angle threshold θTH (YES at 312), and that θMIN2 is less than θMIN1 (NO at 316). As seen in FIG. 12, the processor 102 renders a new straight line 1200 at 320 in FIG. 3, where the new line 1200 is perpendicular to the first line 201 corresponding to θMIN2.

Figure 13:
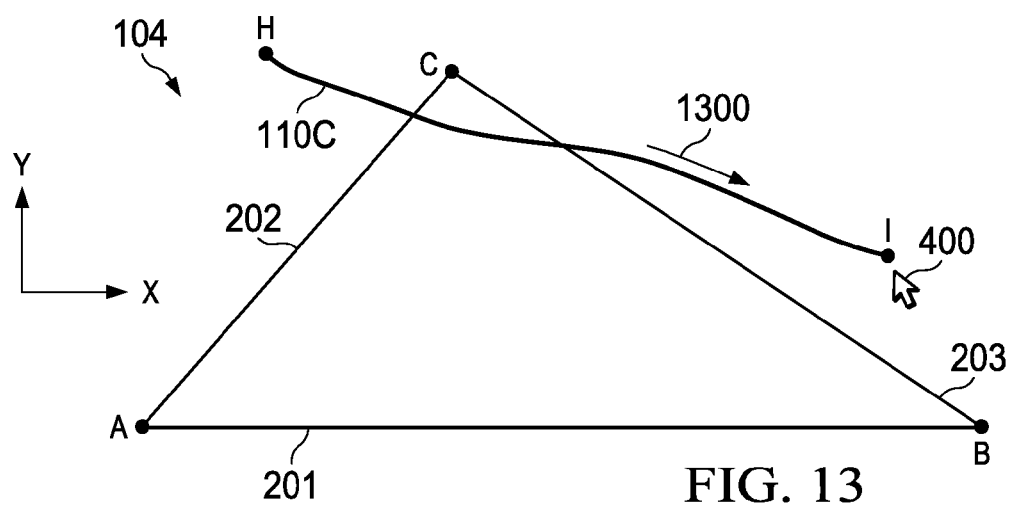
FIG. 13 is a diagram of the display screen showing a third hand drawn line created by the user.
Figure 14:
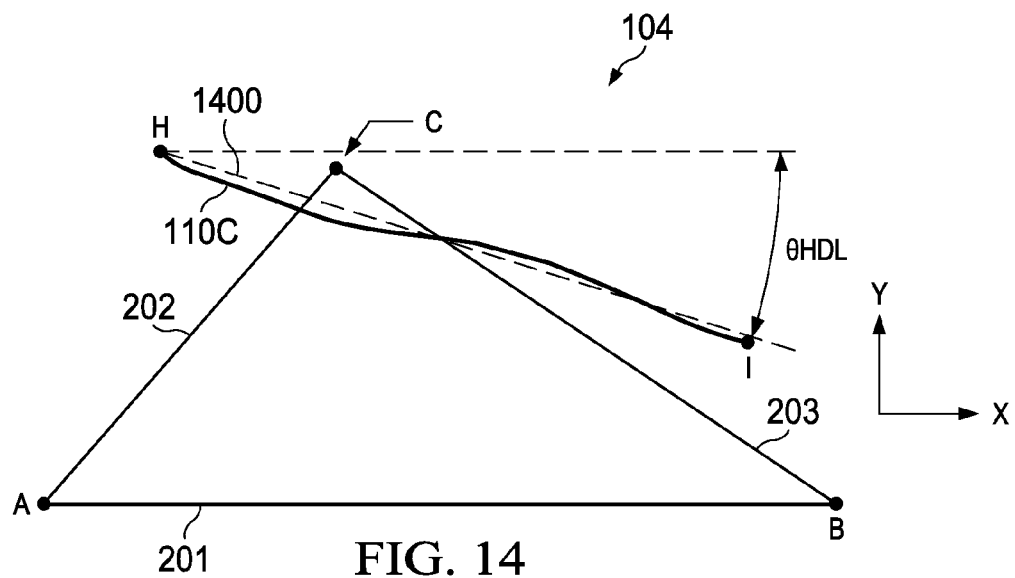
FIG. 14 is a diagram of the display screen showing a computed angle of the third hand drawn line.
Figure 15:
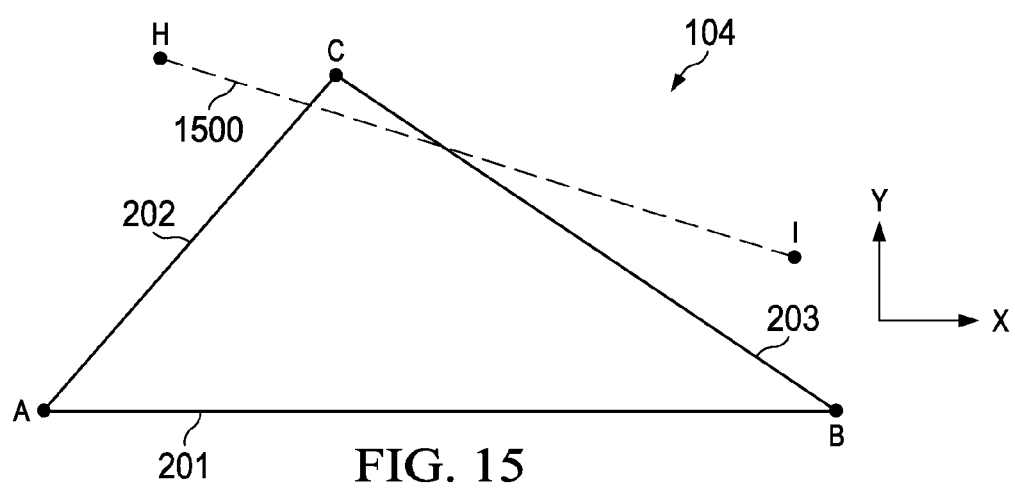
FIG. 15 is a diagram of the display screen showing a new straight line rendered generally at the computed angle of the third hand drawn line created by the user.

FIGS. 13-15 illustrate a third example hand drawn line 110C created by the user through touchscreen or pointing device interaction with the processor 102 via a host system user interface. As seen in FIG. 13, the user draws the hand drawn line 110C extending from a starting point "H" along a direction 1300 to an end point "I". The hand drawn line 110C in this example is not close to being parallel or perpendicular with respect to any of the pre-existing lines 201-203 of the existing triangle shape on the display screen 104. Continuing in FIG. 14, the processor 102 receives this hand drawn line input, performs linear curve fitting to determine a corresponding straight line 1400 and determines a corresponding first angle θHDL relative to the positive X axis direction (304 in FIG. 3). The processor 110 then determines the parallel line-line angles θLL at 306, determines the smallest parallel angle θMIN1 at 308, and determines the smallest perpendicular angle θMIN2 at 310 in FIG. 3. At 312 in FIG. 3, for the example of FIGS. 13-15, however, the minimum parallel and perpendicular angles θMIN1 and θMIN2 are both greater than the angle threshold θTH (NO at 312). Accordingly, the processor 102 renders the new straight line 1500 as shown in FIG. 5 along the first angle θHDL corresponding to the hand drawn line 110C created by the user.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method of rendering lines on a display screen, the method comprising:
   using a processor, determining a first angle corresponding to a hand drawn line created by a user on the display screen;
   using the processor, rendering a new line on the display screen to represent the hand drawn line created by the user;
   using the processor, for one or more existing lines, computing a line to line angle for each of the one or more existing lines, the line to line angle is a difference between the first angle and an angle of the existing line;
   using the processor, for the one or more existing lines, determining a smallest parallel angle as the line to line angle having a smallest absolute value;
   using the processor, for the one or more existing lines, determining a smallest perpendicular angle as the line to line angle offset by 90 degrees having a smallest absolute value;
   using the processor, comparing the smallest parallel angle to the smallest perpendicular angle; and
   using the processor, if the smallest parallel angle is less than the smallest perpendicular angle, selectively rendering the new line on the display screen parallel to the existing line corresponding to the smallest parallel angle.

2. The method of claim 1, further comprising, using the processor, rendering the new line as a straight line.

3. The method of claim 1, further comprising, using the processor, receiving a user interface input corresponding to the hand drawn line from one of a touch screen or a pointing device.

4. The method of claim 1, further comprising: using the processor, if the smallest parallel angle is not less than the smallest perpendicular angle, selectively rendering the new line on the display screen perpendicular to the existing line corresponding to the smallest perpendicular angle.

5. The method of claim 4, comprising:
   using the processor, comparing the smallest parallel angle and the smallest perpendicular angle to an angle threshold;
   using the processor, if both the smallest parallel angle and the smallest perpendicular angle are greater than the angle threshold, rendering the new line on the display screen at the first angle; and
   using the processor, if at least one of the smallest parallel angle and the smallest perpendicular angle is less than the angle threshold, rendering the new line on the display screen parallel to an existing line according to the smallest parallel angle or perpendicular to an existing line according to the smallest perpendicular angle.

6. The method of claim 5, further comprising, using the processor, allowing the user to adjust the angle threshold.

7. The method of claim 5, further comprising, using the processor, rendering the new line as a straight line.

8. The method of claim 1, comprising:
   using the processor, comparing a smallest parallel angle between the first angle and an angle of the existing line to an angle threshold;
   using the processor, comparing a smallest perpendicular angle between the first angle and an angle of the existing line offset by 90 degrees to the angle threshold;
   using the processor, if both the smallest parallel angle and the smallest perpendicular angle are greater than the angle threshold, rendering the new line on the display screen at the first angle; and
   using the processor, if at least one of the smallest parallel angle and the smallest perpendicular angle is less than the angle threshold, rendering the new line on the display screen parallel to an existing line according to the smallest parallel angle or perpendicular to an existing line according to the smallest perpendicular angle.

9. The method of claim 8, further comprising, using the processor, allowing the user to adjust the angle threshold.

10. The method of claim 8, further comprising, using the processor, rendering the new line as a straight line.

11. A non-transitory computer readable medium with computer executable instructions for rendering lines on a display screen, the computer readable medium comprising computer executable instructions for:
    determining a first angle corresponding to a hand drawn line created by a user on the display screen;

rendering a new line on the display screen to represent the hand drawn line created by the user;

for one or more existing lines, computing a line to line angle for each of the one or more existing lines, the line to line angle is a difference between the first angle and an angle of the existing line;

for the one or more existing lines, determining a smallest parallel angle as the line to line angle having a smallest absolute value;

for the one or more existing lines, determining a smallest perpendicular angle as the line to line angle offset by 90 degrees having a smallest absolute value;

comparing the smallest parallel angle to the smallest perpendicular angle;

if the smallest parallel angle is less than the smallest perpendicular angle, selectively rendering the new line on the display screen parallel to the existing line corresponding to the smallest parallel angle.

12. The computer readable medium of claim 11, comprising computer executable instructions for rendering the new line as a straight line.

13. The computer readable medium of claim 11, further comprising computer executable instructions for: if the smallest parallel angle is not less than the smallest perpendicular angle, selectively rendering the new line on the display screen perpendicular to the existing line corresponding to the smallest perpendicular angle.

14. The computer readable medium of claim 11, comprising computer executable instructions for:

comparing a smallest parallel angle between the first angle and an angle of the existing line to an angle threshold;

comparing a smallest perpendicular angle between the first angle and an angle of the existing line offset by 90 degrees to the angle threshold;

if both the smallest parallel angle and the smallest perpendicular angle are greater than the angle threshold, rendering the new line on the display screen at the first angle; and if at least one of the smallest parallel angle and the smallest perpendicular angle is less than the angle threshold, rendering the new line on the display screen parallel to an existing line according to the smallest parallel angle or perpendicular to an existing line according to the smallest perpendicular angle.

15. The computer readable medium of claim 14, comprising computer executable instructions for allowing the user to adjust the angle threshold.

16. A drawing apparatus, comprising:
a processor;
a display screen operatively coupled with the processor;
a user interface to provide input data associated with a hand drawn line created by a user;
the processor operative to execute program instructions to:

determine a first angle corresponding to a hand drawn line created by the user on the display screen, render a new line on the display screen to represent the hand drawn line created by the user, for one or more existing lines, compute a line to line angle for each of the one or more existing lines, the line to line angle is a difference between the first angle and an angle of the existing line, for the one or more existing lines, determine a smallest parallel angle as the line to line angle having a smallest absolute value, for the one or more existing lines, determine a smallest perpendicular angle as the line to line angle offset by 90 degrees having a smallest absolute value, compare the smallest parallel angle to the smallest perpendicular angle, if the smallest parallel angle is less than the smallest perpendicular angle, selectively render the new line on the display screen parallel to the existing line corresponding to the smallest parallel angle.

17. The drawing apparatus of claim 16, wherein the processor is operative to render the new line as a straight line.

18. The drawing apparatus of claim 16, wherein the user interface includes one of a touch screen or a pointing device.

19. The drawing apparatus of claim 16, wherein the processor is operative to: if the smallest parallel angle is not less than the smallest perpendicular angle, selectively render the new line on the display screen perpendicular to the existing line corresponding to the smallest perpendicular angle.

20. The drawing apparatus of claim 16, wherein the processor is operative to:

compare a smallest parallel angle between the first angle and an angle of the existing line to an angle threshold;

compare a smallest perpendicular angle between the first angle and an angle of the existing line offset by 90 degrees to the angle threshold;

if both the smallest parallel angle and the smallest perpendicular angle are greater than the angle threshold, render the new line on the display screen at the first angle; and if at least one of the smallest parallel angle and the smallest perpendicular angle is less than the angle threshold, render the new line on the display screen parallel to an existing line according to the smallest parallel angle or perpendicular to an existing line according to the smallest perpendicular angle.

\* \* \* \* \*